US012264038B2

(12) United States Patent
Liu

(10) Patent No.: US 12,264,038 B2
(45) Date of Patent: Apr. 1, 2025

(54) DEVICE FOR DISPATCHING ELEVATOR, METHOD, AND ELEVATOR-DISPATCHING SYSTEM UTILIZING BLOCK CHAIN

(71) Applicant: HON HAI PRECISION INDUSTRY CO., LTD., New Taipei (TW)

(72) Inventor: Shiaw-Herng Liu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 1344 days.

(21) Appl. No.: 16/885,926

(22) Filed: May 28, 2020

(65) Prior Publication Data

US 2021/0155451 A1 May 27, 2021

(30) Foreign Application Priority Data

Nov. 22, 2019 (CN) ........................ 201911157428.6

(51) Int. Cl.
*B66B 1/46* (2006.01)

(52) U.S. Cl.
CPC ........ *B66B 1/468* (2013.01); *B66B 2201/463* (2013.01); *B66B 2201/4692* (2013.01)

(58) Field of Classification Search
CPC .... B66B 5/00; B66B 1/34; B66B 5/02; B66B 11/04; B66B 1/06; B66B 1/46; B66B 1/14; B66B 3/00; B66B 5/14; B66B 9/02; B66B 1/20; B66B 11/08; B66B 13/08; B66B 13/16; B66B 23/24; B66B 7/00; B66B 7/02
See application file for complete search history.

(56) References Cited

U.S. PATENT DOCUMENTS

2020/0048039 A1* 2/2020 Shila .................. H04W 12/104

FOREIGN PATENT DOCUMENTS

| | | |
|---|---|---|
| CN | 201240726 | 5/2009 |
| CN | 202075812 | 12/2011 |
| CN | 110473106 | 11/2019 |

* cited by examiner

*Primary Examiner* — Jeffrey Donels
(74) *Attorney, Agent, or Firm* — ScienBiziP, P.C.

(57) ABSTRACT

A method for dispatching an elevator applied in a block chain system verifies a call for an elevator by a passenger. The method includes: controlling each node of the block chain system to verify the elevator call; broadcasting information to the block chain system as to verification granted when verification of the elevator call by a node is passed; saving consumption information of the elevator call when the quantity of verifications granted received by the node is greater than a first predetermined value; and controlling and dispatching an elevator to be at the service of the passenger as a dedicated elevator when the elevator call is successful. A device for dispatching elevators when called and a system are also provided.

18 Claims, 5 Drawing Sheets

DEVICE FOR DISPATCHING ELEVATOR, METHOD, AND ELEVATOR-DISPATCHING SYSTEM UTILIZING BLOCK CHAIN

FIELD

The subject matter herein generally relates to block chain transactions, and particularly, to an elevator dispatching device, method, and system utilizing a block chain system.

BACKGROUND

The block chain technology provides distributed data storage, point-to-point transmission, a consensus mechanism, and encryption algorithms. The block chain technology employs the consensus mechanism to achieve a mathematical algorithm. The mathematical algorithm establishes rights between different nodes in the block chain system. In the block chain technology, a unique block chain address is employed by a user, which represents the identity and the funds of the user, and a set of public keywords and private keywords are employed to identify the user and the funds of the user. The real identity of the user is not exposed in the block chain network. In the prior art of elevators, call requests sent by different floors will be treated equally by an elevator dispatching system, different urgencies and priorities are not taken into account.

BRIEF DESCRIPTION OF THE DRAWINGS

Implementations of the present technology will now be described, by way of embodiment, with reference to the attached figures.

DETAILED DESCRIPTION

Figure 1:
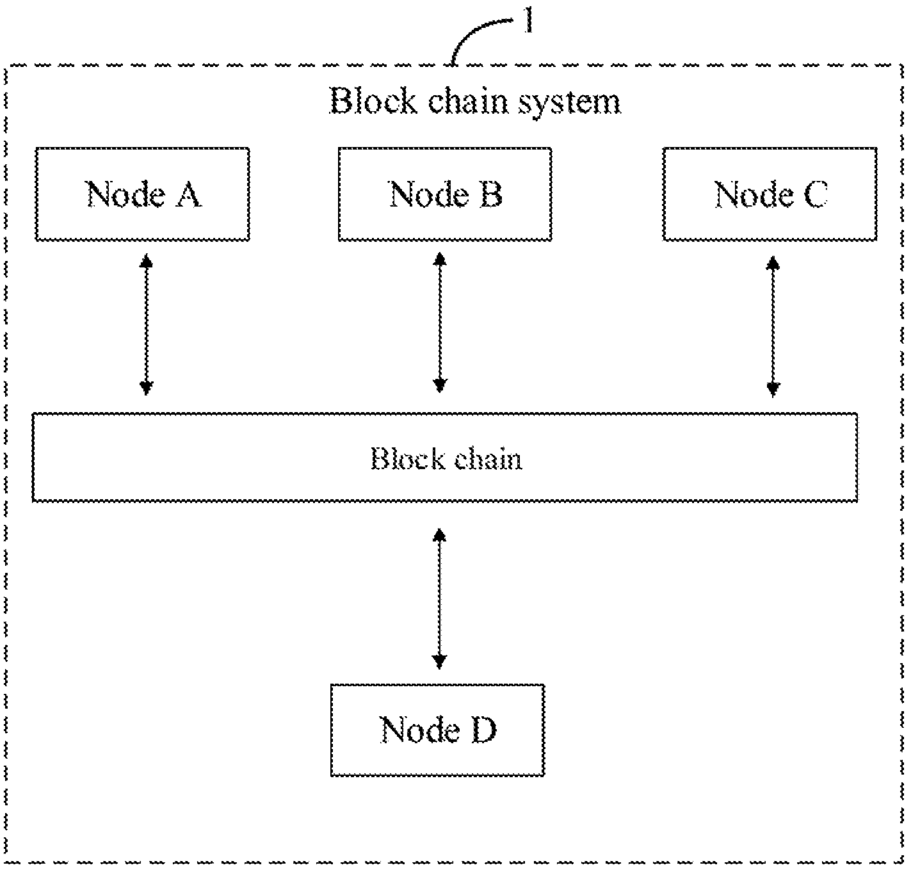
FIG. 1 illustrates a block view of an embodiment of a block chain system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts can be exaggerated to better illustrate details and features. The description is not to be considered as limiting the scope of the embodiments described herein.

Several definitions that apply throughout this disclosure will now be presented.

In general, the word "module," as used herein, refers to logic embodied in hardware or firmware, or to a collection of software instructions, written in a programming language. The software instructions in the modules can be embedded in firmware, such as in an erasable programmable read-only memory (EPROM) device. The modules described herein can be implemented as either software and/or hardware modules and can be stored in any type of computer-readable medium or other storage device.

The term "comprising" means "including, but not necessarily limited to"; it specifically indicates open-ended inclusion or membership in a so-described combination, group, series, and the like.

Embodiments of the present disclosure will be described with reference to the accompanying drawings.

FIG. 1 illustrates a block view of an embodiment of a block chain system. The block chain system 1 comprises a block chain network and a block chain. The block chain network includes a number of nodes. Each node records and saves account balances and block chain addresses of passengers and elevator operators. Users, for example passengers or elevator operators, each employs a unique block chain address to represent their identity and funds, and employs a set of public keywords and private keywords to identify themselves and their funds. Each passenger and elevator operator can use a client terminal, for example, a computer, a smart phone, or the like, to communicate and interact with any node. Thus, the calling of an elevator can be achieved. For example, the passengers and the elevator operators each can communicate with any node through a webpage or an application of a smart phone.

In FIG. 1, the block chain network comprises four nodes, respectively A, B, C, and D. However, the number of the nodes is not limited to four, the block chain network can include more nodes not shown in FIG. 1.

In the embodiment, the elevator operators can be elevator manufacturers, house property companies, or property management companies, etc.

In can be understood that, each node takes account of the block based on the consensus mechanism. When any node broadcasts information or the block to the block chain network, the other nodes receive and verify the received block. When a ratio of a quantity of verified nodes to a quantity of total nodes in the block chain network is greater than a predetermined threshold, the verification of the block chain network to the block is determined to be passed, and all nodes can accept and take account of the block.

Figure 2:
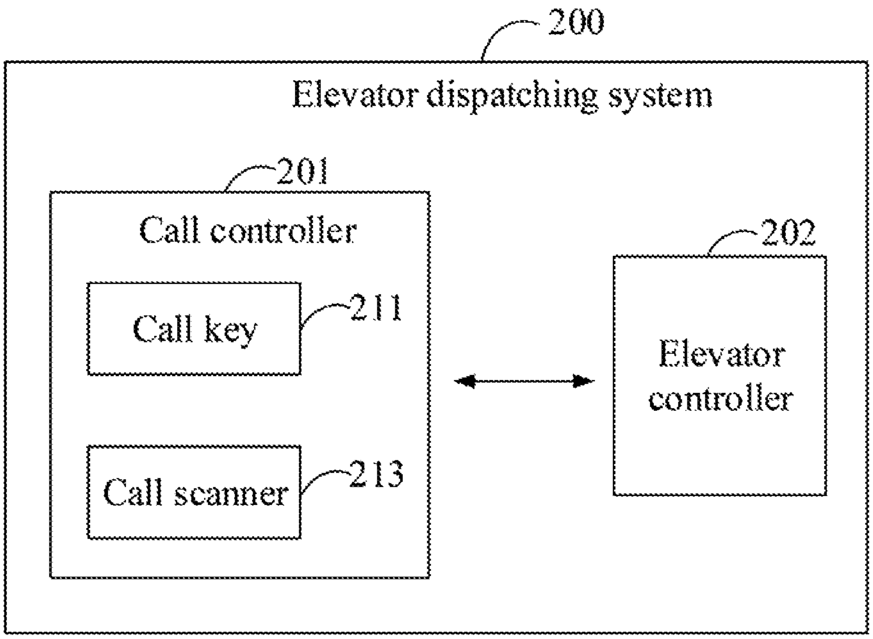
FIG. 2 illustrates a block view of an embodiment of an elevator dispatching system utilizing the block chain system of FIG. 1.

FIG. 2 illustrates a block view of an embodiment of an elevator dispatching system.

In one embodiment, the elevator dispatching system 200 comprises a call controller 201 and an elevator controller 202. The call controller 201 is configured to obtain a private key of a passenger to initiate an elevator call. The call controller 201 can obtain the private key of the passenger by scanning or other methods. For example, the call controller 201 comprises a call key 211 and a call scanner 213. When the call key 211 is pressed, the elevator controller 202 enters an ordinary dispatching mode, and the elevator controller 202 dispatches one or more elevators according to a current dispatching method. When the private key of the passenger is scanned by the call scanner 213, the elevator controller 202 enters an exclusive dispatching mode.

In one embodiment, the private key can display or transmit a quick response (QR) code, the call scanner 213 can scan the QR code of the private key offered by the passenger to initiate an elevator call. If the elevator call is not forbidden, the elevator controller 202 dispatches an elevator to the passenger as a dedicated elevator for the passenger. The dedicated elevator will directly go to the floor where the passenger is located at the service of the passenger. In other embodiments, the private key of the passenger can also be given in other ways, such as in a form of a barcode.

Figure 3:
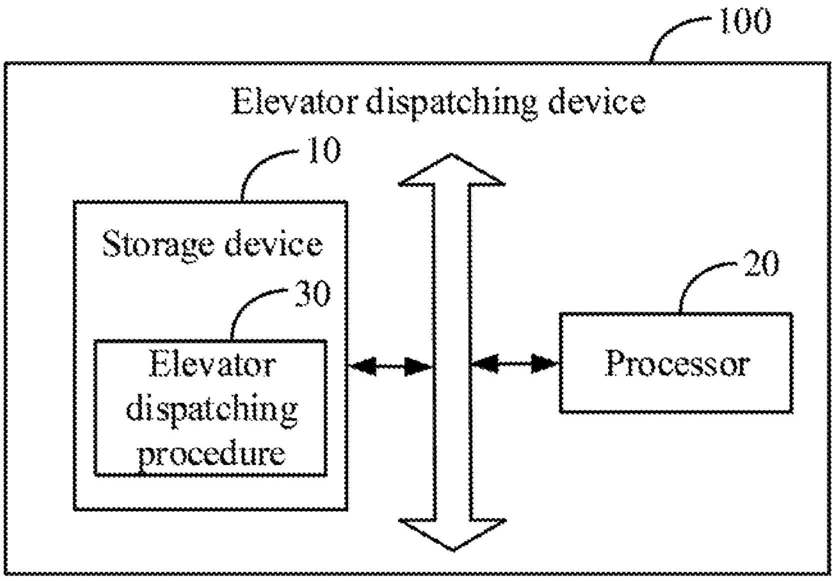
FIG. 3 illustrates a block view of an embodiment of an elevator dispatching device utilizing the block chain system of FIG. 1.

FIG. 3 illustrates a block view of an embodiment of an elevator dispatching device.

In one embodiment, the elevator dispatching device 100 can comprise a storage device 10, at least one processor 20, and an elevator dispatching procedure 30 stored in the storage device 10. The elevator dispatching procedure 30 can be run on the at least one processor 20. The at least one processor 20 can execute the elevator dispatching procedure 30 to accomplish the steps of an elevator dispatching method, for example, the steps S500-S508 of FIG. 5. The at least one processor 20 can alternatively execute the elevator dispatching procedure 30 to accomplish the function of the modules of the elevator dispatching procedure 30, for example, to accomplish the function of the modules 101-106 of FIG. 4.

Figure 4:
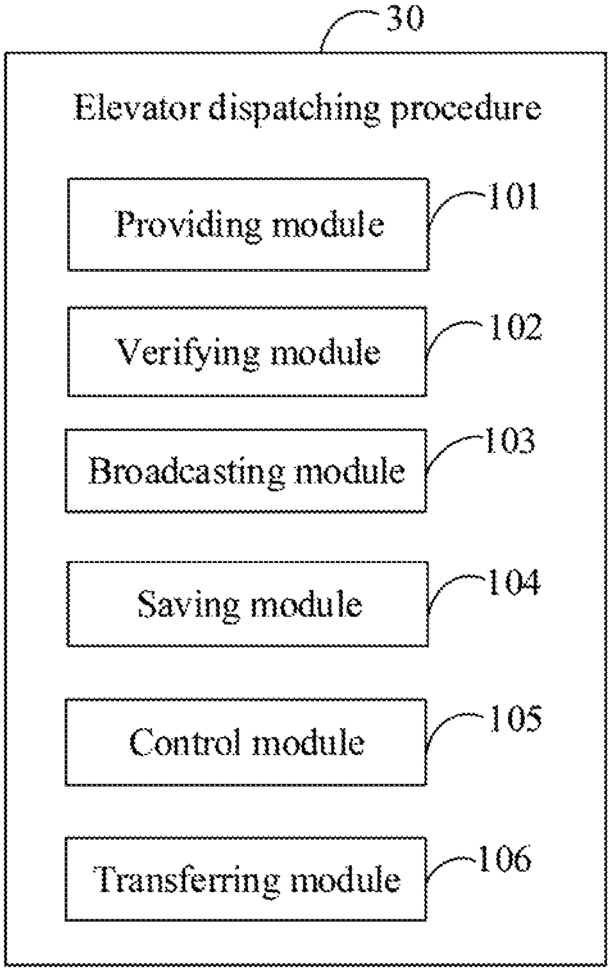
FIG. 4 illustrates a block view of an embodiment of an elevator dispatching procedure in the elevator dispatching device of FIG. 3.

The elevator dispatching procedure 30 can be divided into one or more modules/units. The one or more modules/units can be stored in the storage device 10 and executed by the at least one processor 20. The one or more modules/units can be a series of program instruction segments, which can perform specific functions, and the instruction segment is configured to describe the execution process of the elevator dispatching procedure 30 in the elevator dispatching device 100. For example, the elevator dispatching procedure 30 can be divided into a providing module 101, a verifying module 102, a broadcasting module 103, a saving module 104, a control module 105, and a transferring module 106, as shown in FIG. 4. The detail function of each module is described in FIG. 4.

It can be understood that, the block view exemplified in FIG. 3 is only illustrative of the elevator dispatching device 100. The block view is not to be considered as limiting the elevator dispatching device 100. Additional components can be added, or fewer components can be utilized, or some components can be combined, or different components can be used without departing from this disclosure. For example, the elevator dispatching device 100 may comprise a display device, a network accessing device, a bus, or the like.

The at least one processor 20 can be one or more central processing units, or it can be one or more other universal processors, digital signal processors, application specific integrated circuits, field-programmable gate arrays, or other programmable logic devices, discrete gate or transistor logic, discrete hardware components, and so on. The at least one processor 20 can be a microprocessor or any regular processor, or the like.

The storage device 10 stores the elevator dispatching procedure 30 and/or modules/units. The at least one processor 20 can run or execute the elevator dispatching procedure 30 and/or modules/units stored in the storage device 10, and accomplish the various functions of the elevator dispatching device 100. In addition, the storage device 10 can include a non-transitory storage medium, such as hard disk, memory, plug-in hard disk, smart media card, secure digital, flash card, at least one disk storage device, flash memory, or other transitory storage medium.

FIG. 4 illustrates a block view of an embodiment of the elevator dispatching procedure 30.

The elevator dispatching procedure 30 can comprise the providing module 101, the verifying module 102, the broadcasting module 103, the saving module 104, the control module 105, and the transferring module 106. In one embodiment, the modules can be stored in the storage device 10 and can be run on the at least one processor 20. It can be understood that, in other embodiments, the modules can be instructions or firmware resident in the at least one processor 20.

The providing module 101 is configured to provide a stored-value interface and a consumption interface for a passenger to save virtual currency through the stored-value interface and initiate the elevator call through the consumption interface.

In the embodiment, in the block chain system 1, any one user can employ the private keyword to transfer the funds of the user to the address of the block chain of the other users. Each node in the block chain system 1 can record and save account balance and the block chain addresses of the passengers and of the elevator operators. To pay for the elevator being dispatched, the elevator dispatching device 100 can provide the stored-value interface and the consumption interface, for each of the passengers to save the virtual currency and initiate an elevator call. In detail, the providing module 101 of the user can provide the stored-value interface and the consumption interface, thus the passenger may save the virtual currency through the stored-value interface and initiate the elevator call through the consumption interface.

For example, the passenger can access the block chain system 1 through a mobile application (APP), to check on a balance of the virtual currency stored in the smart contact. If the balance is insufficient for an elevator call, the passenger can recharge the virtual currency through the stored-value interface.

The verifying module 102 is configured to control each of the plurality of nodes to verify the elevator call when the elevator call is initiated by the passenger.

In the embodiment, the verification of each node may comprise confirming that the dispatching of an elevator is indeed initiated by the passenger and the authentication of the current elevator dispatching.

For example, the call controller 201 is installed in a hall, one or more elevators can be used in the hall, and the call controller 201 comprises the call key 211 and the call scanner 213. The call controller 201 can control one or more elevators. A passenger can display or transmit the QR code of the private key through an APP of a mobile phone, the call scanner 213 can scan the QR code, and the call scanner 213 can initiate the elevator call for the passenger. The call scanner 213 may establish a communication connection with a node of the nodes A-D, such as the call scanner 213 establishing the communication connection with the node A in advance. The verifying module 102 is configured to control each node in the nodes A-D to verify the elevator call.

In one embodiment, when the passenger initiates the elevator call, the verifying module 102 is further configured to determine whether an account balance of the passenger is greater than a predetermined balance. The predetermined balance may be an amount of virtual currency which is to be paid for the elevator call. If the account balance of the passenger is greater than or equal to the predetermined balance, the passenger is deemed able to pay the expenses of this elevator call, and the elevator call can be verified. If the account balance of the passenger is less than the predetermined balance, the passenger is deemed unable to pay the expenses of this elevator call. The elevator call can be suspended, and a message of "Insufficient balance" can be outputted to remind the passenger to store the virtual currency.

For example, the passenger shows the QR code of the private key through the APP to allow the call scanner 213 to scan the QR code. When the account balance of the passenger is less than the predetermined balance, the APP can output the message indicating insufficient balance, or a warning module installed in the hall outputs the message of insufficient balance, such as a voice warning module and a text warning module.

The broadcasting module 103 is configured to broadcast verification passed information to the block chain system 1 when the verification of the elevator call by a node of the plurality of nodes is passed.

In the embodiment, when the verification of any node in the block chain system 1 to the elevator call is passed, the broadcasting module 103 can broadcast the verification passed information to the other nodes. For example, the node A may broadcast the verification passed information to the other modes B-D, and can also receive the verification passed information broadcast from the other nodes B-D.

The saving module 104 is configured to save consumption information of the elevator call initiated by the passenger when the quantity of the verification passed information received by the node is greater than a first predetermined value.

In the embodiment, the block chain network can reach a consensus as to the elevator call when the quantity of the verification passed information received by the node being is greater than the first predetermined value. The node may take account of the block generated in the current dispatching of an elevator. The saving module 104 can save the consumption information of the elevator call. The consumption information of the elevator call can be a message that the elevator call is successful, or a message that the elevator call is unsuccessful (such as the elevator call being unsuccessful because of insufficient balance).

For example, when the quantity of the verification passed information received by the node A is greater than the first predetermined value, and the block chain network reaches a consensus as to the elevator call, the saving module 104 saves a block of the elevator call initiated by the passenger to the node A.

In the embodiment, the first predetermined value can be set according to the consensus mechanism. For example, the first predetermined value can be set to be ⅔ of the total nodes.

The control module 105 is configured to control the elevator controller 202 to dispatch an elevator to the passenger as a dedicated elevator when the elevator call is successful.

In one embodiment, when the elevator call is successful, the control module 105 can control the elevator controller 202 to dispatch an elevator to the passenger as a dedicated elevator, the elevator will directly go to the floor where the passenger is located to carry the passenger.

In one embodiment, the elevator assigned to the passenger by the elevator controller 202 is preferably an empty elevator with no passengers.

The transferring module 106 is configured to transfer a first amount of virtual currency from an account of the passenger to an account of the elevator operator when the elevator call is successful.

In the embodiment, the first amount of virtual currency is a per call preset fee, preset by the elevator operator. When the elevator call is successful, the transferring module 106 can transfer the first amount of virtual currency from the account of the passenger to the account of the elevator operator to achieve a payment for exclusive elevator call. In other embodiments, the first amount can be determined by subtracting a preferential price from the fee per call preset by the elevator operator.

Figure 5:
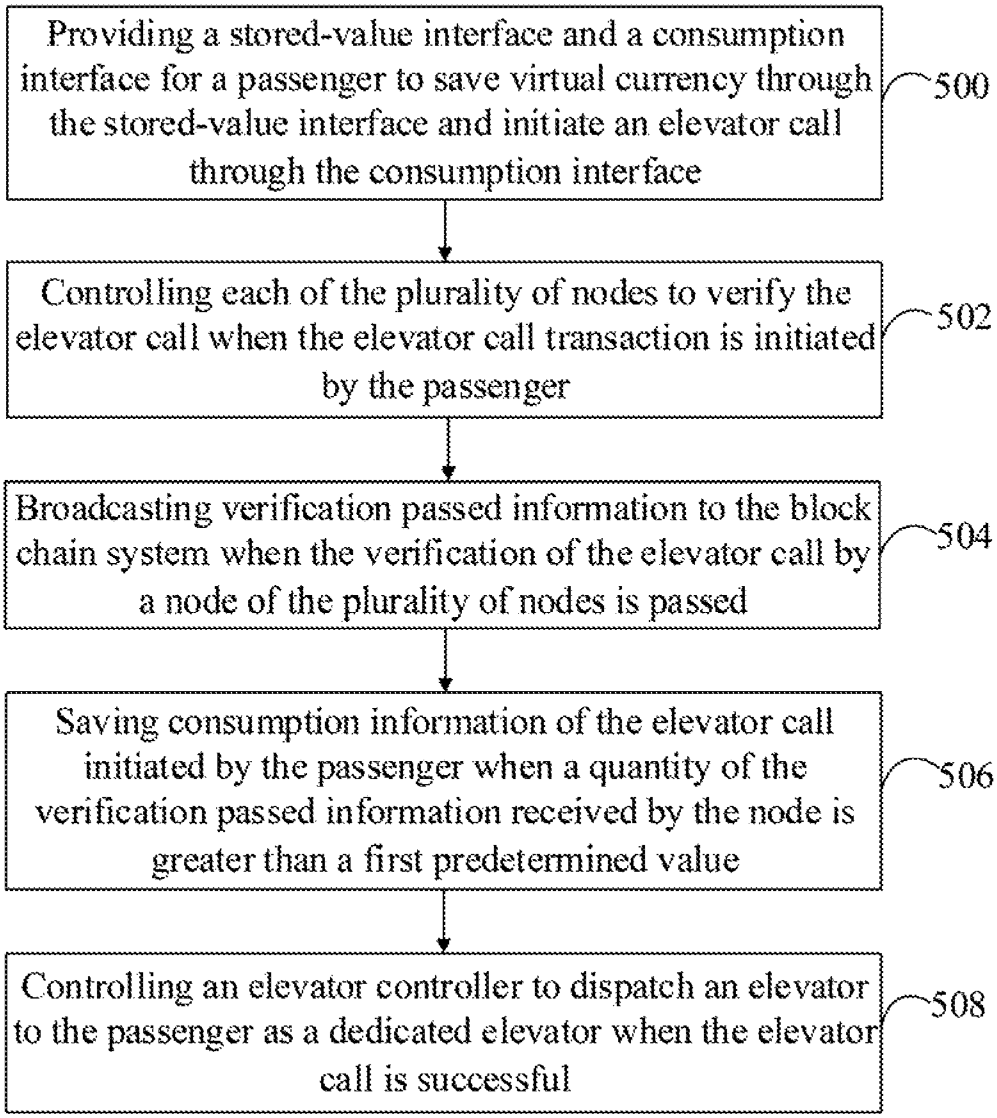
FIG. 5 illustrates a flowchart of an embodiment of a method in an elevator dispatching system utilizing the block chain system of FIG. 1.

FIG. 5 illustrates a flowchart of an embodiment of an elevator dispatching method. The illustrated order of blocks is illustrative only and the order of the blocks can be changed.

At block 500, providing a stored-value interface and a consumption interface for a passenger to save virtual currency through the stored-value interface and initiate an elevator call through the consumption interface.

At block 502, controlling each of the plurality of nodes to verify the elevator call when the elevator call is initiated by the passenger.

At block 504, broadcasting verification passed information to the block chain system 1 when the verification of the elevator call by a node of the plurality of nodes is passed.

At block 506, saving consumption information of the elevator call initiated by the passenger when a quantity of the verification passed information received by the node is greater than a first predetermined value.

At block 508, controlling an elevator controller 202 to dispatch an elevator to the passenger as a dedicated elevator when the elevator call is successful.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. An elevator dispatching device utilizing a block chain system, the block chain system comprising a plurality of nodes, each of the plurality of nodes saving account balances and block chain addresses of passengers, the device comprising:

a storage device; and at least one processor;

wherein the storage device stores one or more programs, which when executed by the at least one processor, causing the at least one processor to:

control each of the plurality of nodes to verify an elevator call based on a consensus mechanism when the elevator call is initiated by the passenger, wherein the elevator call is initiated by a call controller of an elevator dispatching system, the call controller of the elevator dispatching system is communicated with the block chain system;

broadcast verification passed information to the block chain system when the verification of the elevator call by a node of the plurality of nodes is passed;

save consumption information of the elevator call initiated by the passenger when a quantity of the verification passed information received by the node is greater than a first predetermined value; and control an elevator controller to dispatch an elevator to the passenger as a dedicated elevator when the elevator call is successful, wherein when the plurality of nodes reaches a consensus as to the elevator call, the elevator call is deemed successful.

2. The device as described in claim 1, wherein the at least one processor is further caused to:

provide a stored-value interface and a consumption interface for the passenger to save virtual currency through the stored-value interface and initiate the elevator call through the consumption interface.

3. The device as described in claim 1, wherein the at least one processor controlling each of the plurality of nodes to verify an elevator call comprises:

determining whether the account balance of the passenger is greater than a predetermined balance when the elevator call is initiated by the passenger; and controlling each of the plurality of nodes to verify the elevator call when the account balance of the passenger is greater than the predetermined balance.

4. The device as described in claim 3, wherein the at least one processor is further caused to:

suspend the elevator call when the account balance of the passenger is less than the predetermined balance.

5. The device as described in claim 1, wherein the at least one processor is further caused to:

transfer a first amount of virtual currency from an account of the passenger to an account of an elevator operator when the elevator call is successful.

6. The device as described in claim 5, wherein the first amount of virtual currency is a per call fee preset by the elevator operator.

7. The device as described in claim 1, wherein the at least one processor is further caused to:

perform an identity verification of the passenger initiating the elevator call when a private key of the passenger is obtained.

8. An elevator dispatching system, the elevator dispatching system being communicated with a block chain system, the elevator dispatching system comprising:

a call controller configured to obtain a private key of a passenger to initiate an elevator call; and an elevator controller configured to dispatch an elevator to the passenger as a dedicated elevator when the elevator call is successful, wherein the block chain system comprises a plurality of nodes, when the plurality of nodes reaches a consensus as to the elevator call, the elevator call is deemed successful.

9. The elevator dispatching system as described in claim 8, wherein the call controller comprises a call key and a call scanner; the elevator controller enters an ordinary dispatching mode when the call key is pressed, and the elevator controller enters an exclusive dispatching mode when the private key of the passenger is scanned by the call scanner.

10. The elevator dispatching system as described in claim 8, wherein when the elevator call is successful, a smart contract transfers a first amount of virtual currency from an account of the passenger to an account of an elevator operator.

11. The elevator dispatching system as described in claim 10, wherein the first amount of virtual currency is a per call fee preset by the elevator operator.

12. An elevator dispatching method utilizing a block chain system, the block chain system comprising a plurality of nodes, each of the plurality of nodes saving account balances and block chain addresses of passengers, the method comprising:

controlling each of the plurality of nodes to verify an elevator call based on a consensus mechanism when the elevator call is initiated by the passenger, wherein the elevator call is initiated by a call controller of an elevator dispatching system, the call controller of the elevator dispatching system is communicated with the block chain system;

broadcasting verification passed information to the block chain system when the verification of the elevator call by a node of the plurality of nodes is passed;

saving consumption information of the elevator call initiated by the passenger when a quantity of the verification passed information received by the node is greater than a first predetermined value; and controlling an elevator controller to dispatch an elevator to the passenger as a dedicated elevator when the elevator call is successful, wherein when the plurality of nodes reaches a consensus as to the elevator call, the elevator call is deemed successful.

13. The method as described in claim 12, further comprising:

providing a stored-value interface and a consumption interface for the passenger to save virtual currency through the stored-value interface and initiate the elevator call through the consumption interface.

14. The method as described in claim 12, wherein the method of controlling each of the plurality of nodes to verify an elevator call comprises:

determining whether the account balance of the passenger is greater than a predetermined balance when the elevator call is initiated by the passenger; and controlling each of the plurality of nodes to verify the elevator call when the account balance of the passenger is greater than the predetermined balance.

15. The method as described in claim 14, further comprising:

suspending the elevator call when the account balance of the passenger is less than the predetermined balance.

16. The method as described in claim 12, further comprising:

transferring a first amount of virtual currency from an account of the passenger to an account of an elevator operator when the elevator call is successful.

17. The method as described in claim 16, wherein the first amount of virtual currency is a per call fee preset by the elevator operator.

18. The method as described in claim 12, further comprising:

performing an identity verification of the passenger initiating the elevator call when a private key of the passenger is obtained.

* * * * *